(12) United States Patent
Gohle et al.

(10) Patent No.: US 6,645,379 B2
(45) Date of Patent: Nov. 11, 2003

(54) FILTER ELEMENT WITH A FILTER MEDIUM APPLIED TO A SUPPORT BODY

(75) Inventors: Peter Gohle, Schwegenheim (DE); Andre Roesgen, Remshalden (DE); Christian Thalmann, Speyer (DE); Holger Stahl, Zweiflingen (DE); Ralf Poh, Neustadt (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/922,941

(22) Filed: Aug. 7, 2001

(65) Prior Publication Data

US 2002/0070160 A1 Jun. 13, 2002

(30) Foreign Application Priority Data

Aug. 7, 2000 (DE) .......................................... 100 38 412

(51) Int. Cl.⁷ .......................... B01D 29/15; B01D 29/19; B01D 29/52
(52) U.S. Cl. ............... 210/232; 210/323.2; 210/333.01; 210/411; 210/457; 210/483; 210/497.01
(58) Field of Search ............................... 210/323.2, 411, 210/483, 457, 497.01, 232, 333.01; 55/379

(56) References Cited

U.S. PATENT DOCUMENTS

| | | | |
|---|---|---|---|
| 3,353,678 A | * 11/1967 | Dragon | |
| 3,959,140 A | * 5/1976 | Legras | |
| 4,293,414 A | * 10/1981 | Gianneli | |
| 5,723,051 A | 3/1998 | Bartelt et al. | |

FOREIGN PATENT DOCUMENTS

| | | |
|---|---|---|
| DE | 19810518 | 9/1999 |
| DE | 19833381 | 1/2000 |
| GB | 1089753 | * 11/1967 |
| GB | 1337170 | 11/1973 |
| WO | 92/00798 | 1/1992 |

* cited by examiner

Primary Examiner—Thomas M. Lithgow
(74) Attorney, Agent, or Firm—Crowell & Moring LLP

(57) ABSTRACT

A filter element with a cylindrical structure having a filter medium 11 mounted to a support element 10. The filter medium 11 is fastened to the support element 10 in such a way that no relative movement between these components is possible. This creates a heavy-duty assembly between filter medium and support element and increases filter life. It is thus possible for the filter to withstand a pulsating load, e.g., caused by backwashing of the filter medium, without risk of destroying the sensitive filter medium due to vibrations or any relative movement between the support element and the filter medium. This assembly may be produced by mounting the filter medium under tension to the support element and by fixing it with a reinforcement strip 12. The use of valves with switching times of less than 0.4 seconds makes it possible to achieve extremely short backwash pulses to clean the filter without risk of failure of the filter medium.

16 Claims, 4 Drawing Sheets

FILTER ELEMENT WITH A FILTER MEDIUM APPLIED TO A SUPPORT BODY

BACKGROUND OF THE INVENTION

The invention relates to a filter element comprising a support element to which a flexible filter medium is applied. The invention further relates to a filter comprising a housing in which a filter element of the foregoing type is installed. The invention additionally relates to a method of backwashing a filter of the aforedescribed type.

Filter elements of the foregoing type are known. For instance, DE 198 33 381 A1 discloses a filter element comprising a helical spring as a support element to which a filter foil is mounted. This filter foil contains fine slots that allow the fluid to be filtered to flow through and retain the particles to be filtered out. As an alternative to this foil, screen netting may also be used for filtering.

These filters are used, for example, as backwash filters. Backwashing serves to clean the influent side of the filter medium when it becomes dirty and the openings through which the fluid passes become clogged. The filter medium on the support element is subject to mechanical loads due to the backwash pulses as well as resulting from any pulsating fluid flow. Over time, the alternating loads applied to the filter medium by the fluid to be filtered cause mechanical fatigue in the filter medium, which can lead to failure. The filter foil may tear, so that the purity of the filtrate is compromised.

SUMMARY OF THE INVENTION

It is the object of the present invention to provide a filter element comprising a support element and a filter medium mounted thereto, which is reliable in operation and has a long service life.

This object and other objects are attained in accordance with the present invention by providing a filter element comprising a cylindrical support element which is permeable to a fluid to be filtered, and a filter medium fixed to the support element which retains oversize particles contained in the fluid to be filtered, wherein the filter medium is fixed to the support element in such a way that relative movement between the filter medium and support element due to fluid flow through the filter element is prevented.

In accordance with a further aspect of the invention, the objects are achieved by providing a filter comprising an openable housing having an inlet for a fluid to be filtered and an outlet for filtered fluid, and a filter element disposed in the housing between the inlet and the outlet, the filter element comprising a cylindrical support element which is permeable to a fluid to be filtered, and a filter medium fixed to the support element which retains oversize particles contained in the fluid to be filtered, wherein the filter medium is fixed to the support element in such a way that relative movement between the filter medium and support element due to fluid flow through the filter element is prevented.

In accordance with another aspect of the invention, the objects are achieved by providing a method of backwashing a filter according to the invention comprising opening a discharge valve at a sludge outlet so that fluid from the filter flows in a reverse direction through the filter element and cleans the filter element, whereby sludge removed by backwashing from the filter element is discharged from the sludge outlet together with a portion of fluid, and thereafter closing the discharge valve so that fluid in the filter flows in a normal filtering direction, wherein the entire backwashing process takes less than 2 seconds per filter element.

The filter element according to the invention is characterized in that the filter medium is fixed to the support element, particularly a support tube, in such a way that any relative movement between filter foil and support element is prevented. This is true even if the fluid flow results in pulsating stress on the filter medium. It has been shown that mechanical loading of the filter medium is primarily produced by relative movements on the support element or by vibrations of parts of the filter medium excited by pulsations in the fluid to be filtered. A pulsating load can also be generated by backwashing with previously filtered fluid in order to clean the filter element. Critical loading of the filter medium is also caused by deformation due to indentations or buckling of unsupported partial areas of the filter medium. This may occur when the pressure difference on the filter medium is reversed, e.g., during backwashing of the corresponding filter. If the relative movement between filter medium and support element is prevented, however, the filter medium is simultaneously stabilized by the support element to the point where vibrations of the filter medium are also effectively prevented.

The flexible filter medium is disposed around the support element. To this end, the support element preferably is cylindrical to assure uniform bending of the filter medium. However, the cross section of the support element may also deviate from the circular form. Elliptical cross sections, for example, are also feasible. Screen mats made, for example, from woven wires may be used as the filter medium. Another option is to use slotted or perforated foils. These foils are extremely thin, and the slots or holes are suitable for allowing the fluid to be filtered pass through while the oversize particles in the fluid are retained. The size of the holes or slots directly influences the size of the particles being retained. Flow through the filter medium from the outside toward the inside is just as feasible as from the inside toward the outside. Backwashing is achieved by reversing the flow direction of the fluid.

In accordance with one specific embodiment of the invention, the filter medium contacts at least 3% of the support area provided by the support element without any play between the filter medium and the contacted areas of the support element. Contact occurs in different support regions, which are uniformly distributed over the entire support area. Tolerances between the support regions result, for example, from production inaccuracies of the support element. In the major part of the remaining support area, a radial clearance tolerance of a maximum of 0.2 mm is permitted with respect to the lateral surface formed by the support element. This assures that due to tolerances between support element and filter medium the support regions are randomly distributed over the support area and that the respective support regions are close enough to one another that any vibration of the filter medium between the individual support regions is effectively prevented.

The support area provided by the support element is smaller than the lateral surface area of the support element. The lateral surface area is provided with openings to allow the filtered fluid to pass from the clean side of the foil on the exterior of the support tube to the interior or vice versa. Thus the support area is formed by the segments between the openings. A support tube may, for example, comprise a helical spring. Another possibility is to use a perforated metal sheet that is bent into a tube. It is particularly advantageous to use so-called slot or gap tubes. They comprise a helically coiled strand having a, for example, triangular cross section. If desired, the support tube may be provided with axial supports to impart greater stability. The support area may advantageously be minimized to the edge of the triangular cross section of the strand so that the largest possible portion of the lateral surface is not covered by the support element, but is available directly for filtering.

It has been found that even if the permissible tolerance of 0.2 mm between filter medium and support element is exceeded over a maximum of 15% of the support area, a uniform distribution of the support regions on the support area is assured. The actual clearance tolerance may be exceeded, for instance, due to a fold in the filter foil created when the foil is bent around the support element. Such deformations, however, have an increased intrinsic rigidity due to their geometry, which also helps prevent vibrations in the filter medium. Consequently, an additional support by the support regions in these zones of the filter medium is not required.

In accordance with another specific embodiment of the invention, the filter medium is applied to the support element in such a way that only tensile forces act in the filter medium in tangential direction with respect to the circumference of the support element. This is achieved by mounting the filter medium on the support element under tensile stress. Tensile forces are then superimposed on any compression forces that may occur due to the curvature of the filter medium around the support element. These tensile forces must thus be greater than the largest compression force that occurs on the inside surface of the cylindrical filter medium due to the bending moment of the filter medium.

It is particularly advantageous if the tensile forces in the foil are large enough so that they also exceed the compression forces in the foil that occur as a result of the pulsating stress applied to the foil by the fluid. Any change in the pressure on the foil can cause the foil briefly to contract, which may produce compression forces. To prevent these forces from briefly detaching the foil from the support element, the tensile force present in the filter foil may simply be increased.

The tensile forces in the filter medium cause the filter medium to conform better to the support element. This makes it possible to reduce the radial clearance tolerance so that more support regions for the filter medium are created on the support area. Thus, the assembly between filter medium and support element in accordance with the invention becomes more stable against vibrations or any relative movement between the two components.

In accordance with one specific embodiment, the filter element is constructed in such a way that the tensile stress as viewed over the radial thickness of the filter medium has an average value of at least 5 $N/mm^2$. The average value is calculated from the superposition of any bending moment that results from the elasticity of the foil bent around the supporting element and the tensile stress that is created in the filter medium by the assembly process. It has been found that an average value of at least 5 $N/mm^2$ is sufficient to prevent any undue stress on the filter medium. The degree by which the filter medium has to be prestressed ultimately depends on the individual case, i.e., on the intensity of the pulsating load or the pressure changes on the filter element.

A particular embodiment of the filter element is obtained if the filter foils used as the filter medium are between 0.1–1 mm thick. In these foils, tensile stresses of at least 8 $N/mm^2$ along the radially outward facing surface of the filter foil provide adequate protection of the filter foil against impermissibly high loads. This value can be readily measured in a quality control operation to assure production of reliable filter elements.

An advantageous embodiment of the invention results if the edges of the filter medium, which join it along the longitudinal dimension of the filter element to form a cylindrical body, are soldered together. This creates a strong joint of the filter medium and at the same time seals its edges. In addition, this soldered connection can permanently absorb any tensile stresses acting on the filter medium in tangential direction. This effect can be further enhanced by enlarging the surface of the soldered connection with the use of a reinforcement strip placed over the joint edges of the filter medium. This creates a gap between the reinforcement strip and the filter medium, which can be filled by the solder material.

Compared to standard overlapping soldering of the filter foil, the use of a reinforcement strip has the great advantage that no shoulder is created between the filter medium and the support element. In terms of the inventive concept, this further improves the fit of the filter medium on the support element. The filter medium is butted edge-to-edge and then soldered together with the reinforcement strip. The strip may be fixed radially either to the outside or the inside of the filter medium. If the strip is fixed to the inside, a corresponding groove must be formed in the filter medium to avoid a shoulder formed by the filter medium resting on the support element.

The filter element of the invention can be inserted into a filter having an openable housing. The filter element is inserted into the housing in such a way that an influent side of the filter, which is provided with an inlet, is separated from the effluent side of the filter, which is provided with an outlet. Advantageously, the filter housing can additionally be equipped with a backwash mechanism that reverses the flow direction through the filter medium. This permits simple cleaning of the influent side of the filter medium. The particles removed in the cleaning operation must be discharged from the filter housing.

In accordance with a further embodiment of the invention, fast valves with switching times of less than 0.4 seconds are provided at least as discharge valves for the sludge removed in the cleaning operation. These valves, which can for instance be configured as solenoid valves, permit pulsed backwashing of the filter foil. This increases the cleaning effectiveness. The use of fast valves for filter elements with filter foils is possible only if the foils are fixed to the support element as described above. Otherwise the quick load changes due to pulsed cleaning would cause the filter foil to fail as described above, as a result of the cyclical, high mechanical loads. The advantage of pulsed cleaning is the small amount of fluid required for the backwash process. The fluid for backwashing is already filtered, so that a greater backwash would create losses and would make the filtering process less effective. Reducing the backwash amount lowers the process costs for cleaning the fluid to be filtered.

The valves may be controlled by a controller, which makes it possible optimally to adapt the cleaning process to the respective conditions under which the filter is used. The backwash intervals as well as the characteristics of the backwash process are variable. In electrically actuated valves, the backwash process can for instance be controlled via the flow of the actuating current.

Normally, the backwash filters are operated as a series of several filter elements. During backwashing, only one of the filter elements is thus out of operation while the others continue to be available for filtering the fluid to be filtered. Due to the very short backwash pulses, however, the use of a single filter element is also feasible for certain applications. In these cases, pulse cleaning interrupts the filter process only very briefly, which in certain applications has no effect.

According to one specific embodiment of the invention, the intake valves mounted on the influent side of the filter element are also fast valves with short switching times. This permits a particularly effective configuration of the backwash process. During the backwash process the intake valves are closed, and the discharge valves are open. This causes a back flow from the clean side of the filter through the discharge valves, so that dirt collected on the influent side of the filter element is cleaned off and discharged through the sludge outlet. This avoids liquid losses at the intake of the filter device.

A particularly advantageous process for operating the filter according to the invention comprises opening the valves involved in the backwash process, discharging the usually sludge-like filtrate, and closing the valves. The entire process requires less than 2 seconds per filter element. This short duration of the process has the aforedescribed advantages of pulsed cleaning of the filter element. During this process, at least the discharge valves of the filter elements that are to be cleaned are opened. If intake valves sealing the influent side of the filter element with respect to the intake lines are provided in addition, these valves are also closed. A time shift in opening/closing the intake and discharge valves can produce particularly advantageous cleaning effects that must be determined as a function of the corresponding application.

The short periods involved in pulsed cleaning also increase the capacity of the filter system and make it possible to filter fluids with a high dirt concentration. In these cases, frequent cleaning is necessary. This can be provided, since the individual cleaning pulses are very short, so that the cleaning only marginally decreases the filter capacity of the individual filter elements over time.

These and other features of preferred embodiments of the invention are set forth in the claims as well as in the description and the drawings. The individual features may be implemented either alone or in combination in embodiments of the invention or in other fields of use and may represent advantageous embodiments that are protectable per se, for which protection is hereby claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
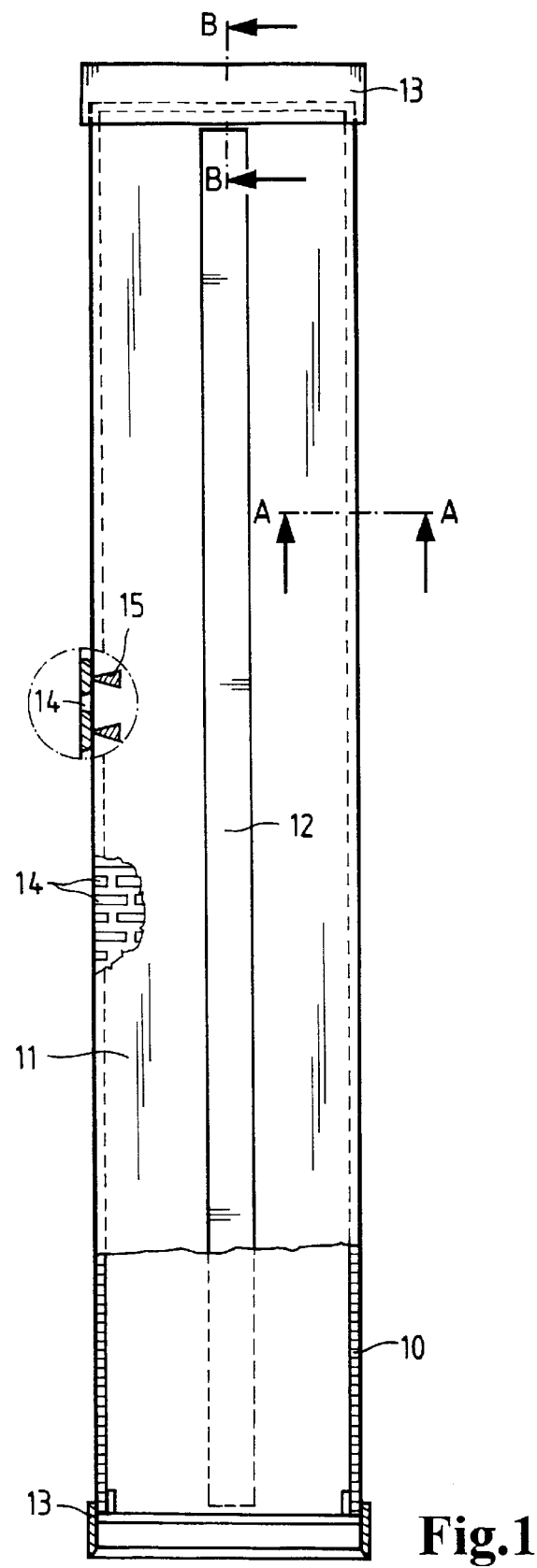
FIG. 1 is a partially cut away view of a filter element according to the invention.

The filter element according to FIG. 1 comprises a support element 10, a filter medium 11, which is disposed around the support element 10 and is fastened by means of a reinforcement strip 12, and two end rings 13, which reinforce the end face edges of the support element and the filter medium and are suitable for clamping the filter element inside a housing (not shown). The filter element is a slot-type foil as shown in the detail of FIG. 1. The width of the slots 14 is a function of the size of the particles to be filtered out. The support element consists of a gap tube, which is wound in the form of a helical spring from a strand with a triangular profile 15.

Figure 2:
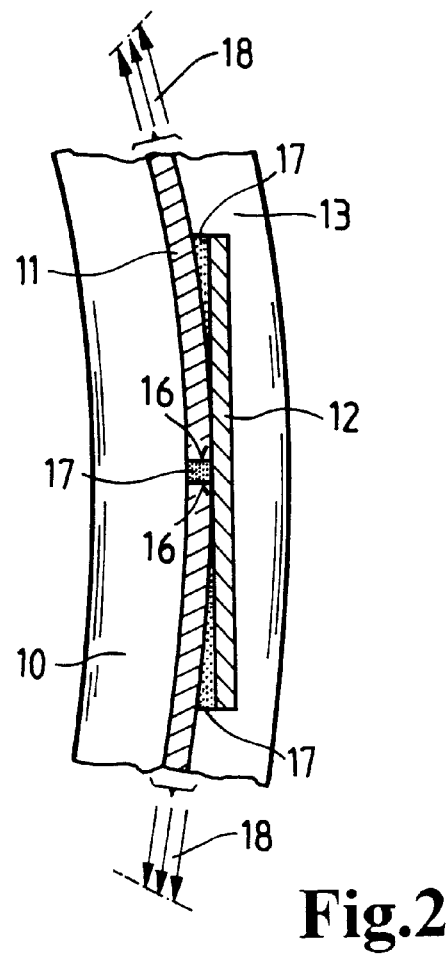
FIG. 2 is a detail view taken along section line A—A of FIG. 1.

As shown in FIG. 2, support element 10 and filter medium 11 form an assembly, wherein the filter medium is mounted to the support element. The edges 16 of the filter medium 11 are joined on the support element by a soldered connection 17. The reinforcement strip 12 enlarges the surface area of the soldered connection 17, so that this connection becomes more rigid and can absorb tensile forces 18, which act on the filter medium in tangential direction. The tensile forces in the filter medium increase in radial direction since a bending moment of the filter medium on the support element is superimposed, which produces compression forces in the inner portion of the filter medium and tensile forces in the outer portion.

Figure 3:
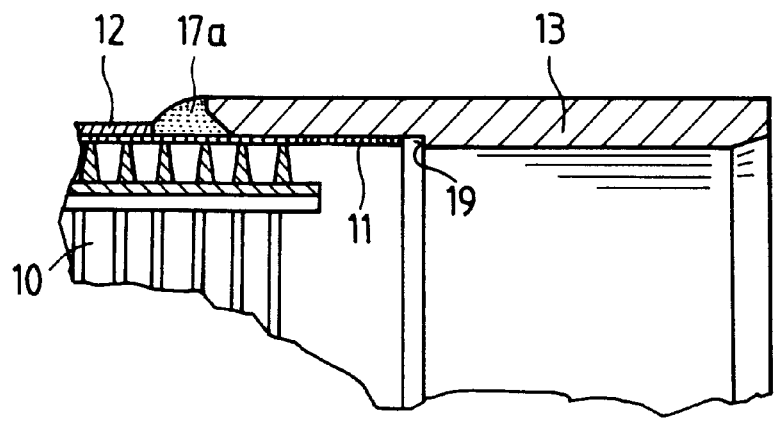
FIG. 3 is a sectional view taken along line B—B of FIG. 1.

FIG. 3 shows how the assembly of the support element 10 and the filter medium 11 is inserted into the end ring 13. The end ring has a shoulder 19 on the inside to facilitate the joining of the end ring to the filter medium. After the joining operation, the filter medium and the end ring 13 are fixed by a soldered connection 17a. Also visible is the end of the reinforcement strip 12 on the slot foil that forms the filter medium 11. The gap tube, which is formed by the helically wound strand with the triangular profile 15, is stabilized by a reinforcement segment 12a. Several such reinforcement segments 12a may be distributed around the inner circumference of the gap tube. In addition to reinforcing the gap tube as a whole, the reinforcement segment 12a also ensures a constant spacing of the individual windings of the gap tube with respect to one another. This makes the gap tube easier to handle as a component and facilitates the production of the filter element.

Figure 4:
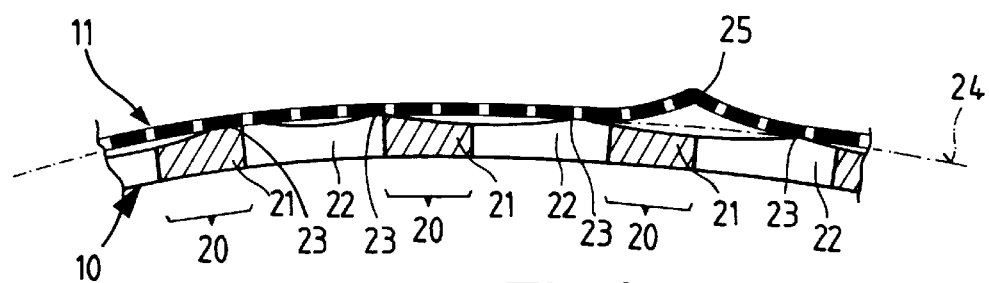
FIG. 4 is an enlarged section through a support element made of perforated sheet metal with mounted filter foil.

FIG. 4 shows a detail of the assembly formed by the support element 10 and the filter medium 11, in which the support element is formed by a perforated metal sheet. A support area 20 of the support element 10 is formed by segments 21 between the holes 22 of the perforated metal sheet. Support regions 23 are the portions of the support area against which the filter medium 11 rests. Outside the support regions, there is a radial tolerance between the support element 10 and the filter medium 11, which for the most part does not exceed 0.2 mm. This tolerance is measured as the distance between the inside of the filter medium 11 and a lateral surface 24, which is formed by the outside of the support element.

In partial areas, the filter medium may also be spaced at a distance greater than 0.2 mm from the support element, e.g., in the area of a fold 25 in the filter medium. The fold, due to its profile, should be viewed as stiffening the filter medium, so that vibrations in the filter medium are avoided in this area as well.

Figure 5:
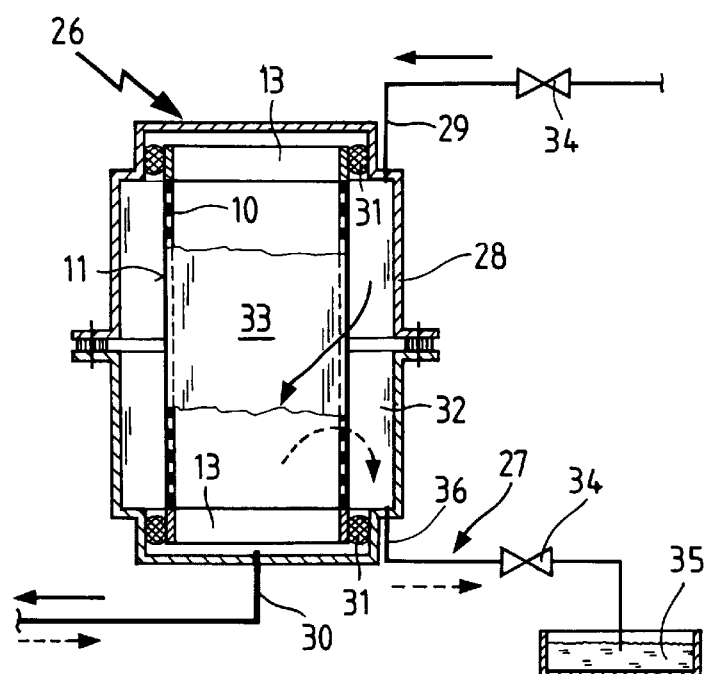
FIG. 5 is a central sectional view of a filter element arranged inside a filter housing equipped with a device for backwashing the filter.

FIG. 5 shows the construction of a liquid filter 26 with backwash mechanism 27 comprising an openable housing 28 with inlet 29 and outlet 30.

The filter element, which comprises end rings 13, support element 10 and filter medium 11, is mounted in housing 28 with the aid of sealing rings 31. The flow direction of the fluid to be filtered within the lines and the housing is indicated by the solid arrows. The fluid flows into the housing, which is divided by the filter medium 11 into an influent side 32 and an effluent side 33. The fluid is thereby filtered, and the separated particles are collected on the influent side 32 of the filter. To clean the influent side from the separated solids, the backwash mechanism 27 can be actuated via valves 34. The backwash mechanism comprises at least the necessary valve mechanisms and a sludge discharge 36 provided on the influent side. During the backwash process a fluid flow in the direction of the broken arrows is created for a brief time to clean the influent side of the filter medium 11, and the dirt is discharged from the housing 28 and deposited in a collecting basin 35.

Figure 6:
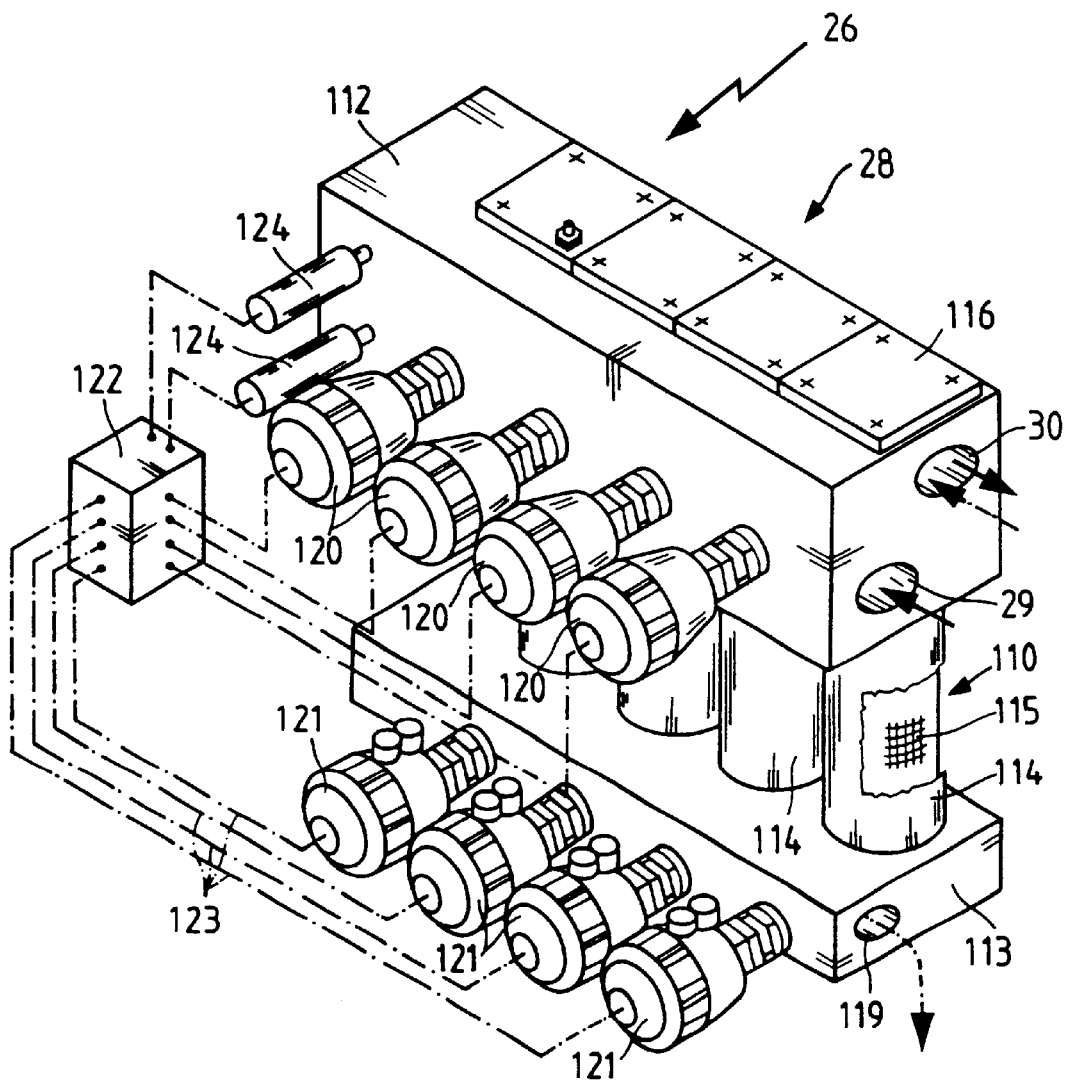
FIG. 6 shows the construction of a modular housing comprising a plurality of filter elements and fast switching valves.

FIG. 6 schematically depicts the structure of a modular liquid filter 26. A filter space 110 is formed by a housing 28 that is comprised of an upper part 112 and a lower part 113, which tightly seal the tubular transition pieces 114 along their ends. The filter space 110 is thus essentially formed by the transition pieces 114. The filter elements 115 are inserted into the filter spaces 110 through openings that are provided for this purpose in the upper part 112. A cover 116 seals the openings in the upper part.

The fluid to be filtered reaches the filter elements through intake 29 on the influent side and after filtering leaves the housing through outlet 30 on the effluent side. For backwashing, a sludge outlet 119 is further provided in the lower part 113. The backwash process is realized by closing intake valves 120 at the intake and opening discharge valves 121 at the sludge outlet. This creates a reverse flow of the filtered fluid through sludge outlet 119 during which the flow direction through the filter elements 115 is also reversed. This causes the filter elements to be cleaned and the filter sludge subsequently to be discharged through the sludge outlet 119.

The intake valves 120 and the discharge valves 121 are actuated by control means 122, which is connected to the valves via wires 123. The figure depicts the use of directly controlled solenoid valves to reverse the flow direction at the filter element. An alternative is the use of compressed air valves, which in turn are controlled by solenoid valves (not shown). Short backwash pulses are sufficient to clean the filter inserts, while a longer flow reversal may be necessary to discharge the sludge. The controller triggers the backwash process when pressure sensors 124 indicate that a predefined pressure difference between the influent side and the effluent side is exceeded. Other trigger mechanisms, such as a timer, may of course also be used.

The sludge outlet 119 leads to a collecting basin (not shown) similar to the apparatus described in FIG. 5. Due to the very short backwash pulse the filtered solids trapped in the collecting basin are optimally concentrated, so that only a small amount of fluid to be filtered is wasted. This also reduces the disposal costs for the sludge, since its volume is small.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising a cylindrical support element which is permeable to a fluid to be filtered, and a filter medium fixed to said support element which retains oversize particles contained in the fluid to be filtered, wherein the filter medium is fixed to the support element in such a way that relative movement between the filter medium and support element due to fluid flow through the filter element is prevented, and wherein the filter medium:

contacts without play at least 3% of a support area provided by the support element, said 3% of the support area being composed of support regions uniformly distributed over said support area;

has a radial clearance tolerance with respect to a lateral surface formed by the support element and containing the support area which exceeds 0.2 mm over not more than 15% of the support area, and has a radial clearance tolerance with respect to said lateral surface which is at most 0.2 mm over at least 85% of the support area.

2. A filter element comprising a cylindrical support element which is permeable to a fluid to be filtered, and a filter medium fixed to said support element which retains oversize particles contained in the fluid to be filtered, wherein the filter medium is fixed to the support element in such a way that relative movement between the filter medium and support element due to fluid flow through the filter element is prevented, and wherein the filter medium is mounted to the support element under tensile stress in a tangential direction relative to the circumference of the support element.

3. A filter element according to claim 2, wherein the tensile stress has an average value of at least 5 N/mm$^2$ viewed over the radial thickness of the filter medium.

4. A filter element according to claim 2, wherein the filter medium comprises a 0.1 to 1 mm thick filter foil under a tensile stress of at least 8 N/mm$^2$ along the radially outward surface of the filter foil.

5. A filter element according to claim 2, wherein longitudinal edges of the filter medium are soldered together.

6. A filter element according to claim 5, wherein the soldered joint is provided with a reinforcement strip which enlarges the joint surface.

7. A filter comprising an openable housing having an inlet for a fluid to be filtered and an outlet for filtered fluid, and a filter element disposed in said housing between said inlet and said outlet, said filter element comprising a cylindrical support element which is permeable to a fluid to be filtered, and a filter medium fixed to said support element which retains oversize particles contained in the fluid to be filtered, wherein the filter medium is mounted to the support element under tensile stress in a tangential direction relative to the circumference of the support element and fixed to the support element in such a way that relative movement between the filter medium and support element due to fluid flow through the filter element is prevented.

8. A filter according to claim 7, wherein the filter medium of the filter element:

contacts without play at least 3% of a support area provided by the support element, said 3% of the support area being composed of support regions uniformly distributed over said support area;

has a radial clearance tolerance with respect to a lateral surface formed by the support element and containing the support area which exceeds 0.2 mm over not more than 15% of the support area, and has a radial clearance tolerance with respect to said lateral surface which is at most 0.2 mm over at least 85% of the support area.

9. A filter according to claim 7, wherein the tensile stress has an average value of at least 5 $N/mm^2$ viewed over the radial thickness of the filter medium.

10. A filter according to claim 7, wherein the filter medium of the filter element comprises a 0.1 to 1 mm thick filter foil under a tensile stress of at least 8 $N/mm^2$ along the radially outward surface of the filter foil.

11. A filter according to claim 7, wherein longitudinal edges of the filter medium are soldered together.

12. A filter according to claim 11, wherein the soldered joint is provided with a reinforcement strip which enlarges the joint surface.

13. A filter comprising an openable housing having an inlet for a fluid to be filtered and an outlet for filtered fluid, and a filter element disposed in said housing between said inlet and said outlet, said filter element comprising a cylindrical support element which is permeable to a fluid to be filtered, and a filter medium fixed to said support element which retains oversize particles contained in the fluid to be filtered, wherein the filter medium is fixed to the support element in such a way that relative movement between the filter medium and support element due to fluid flow through the filter element is prevented and further comprising a backwash mechanism for cleaning the filter medium, said backwash mechanism including at least one discharge valve for discharging sludge removed from the filter medium by backwashing, wherein said discharge valve has opening and closing times of less than 0.4 seconds each.

14. A filter according to claim 13, further comprising at least one intake valve on an influent side of the filter, wherein said intake valve has opening and closing times of less than 0.4 seconds each.

15. A filter according to claim 13, wherein the filter medium is mounted to the support element under tensile stress in a tangential direction relative to the circumference of the support element.

16. A filter according to claim 15, wherein the tensile stress has an average value of at least 5 $N/mm^2$ viewed over the radial thickness of the filter medium.

* * * * *